June 12, 1951     C. B. SCOTT     2,556,299
METHOD OF GENERATING DIRECTIONAL SEISMIC WAVES
Filed Sept. 12, 1947     2 Sheets—Sheet 1

Clarence B. Scott    Inventor
By W. O. ꞏ Heilman    Attorney

Patented June 12, 1951

2,556,299

UNITED STATES PATENT OFFICE 2,556,299

METHOD OF GENERATING DIRECTIONAL SEISMIC WAVES

Clarence B. Scott, Tulsa, Okla., assignor to Standard Oil Development Company, a corporation of Delaware Application September 12, 1947, Serial No. 773,605

3 Claims. (Cl. 181—.5)

The present invention relates to an improved method for seismic exploration. It particularly concerns the production of seismic energy having directional properties whereby improved results may be obtained in seismic prospecting, particularly in the field of reflection seismography.

Reflection seismography is typically carried out by setting off a charge of explosives at a set point known as the "shot-point" and picking up the waves emanating from the explosion after they have been reflected by sub-strata. Geophones or seismo-pickups used to receive the reflected seismic waves, are arrayed in any desired fashion, generally in line with the shot-point and spaced from the shot-point and from each other. These geophones are devices which are provided with means for converting the mechanical vibrations imparted by seismic waves into electrical impulses. Each geophone is connected to a suitable electrical amplifying circuit, the output of which is connected to a moving coil galvanometer with a mirror attached to the coil. Conventionally these galvanometers are arranged in a battery relative to a light source and a moving strip of sensitized paper so that a plurality of wave forms or traces will be recorded on the paper; each trace corresponding to the seismic wave received by a particular geophone. The strip of recording paper is moved longitudinally at a substantially constant speed and is provided with transverse time marks so as to make possible the indication of the instant of the shot and the determination of the time of arrival of any particular point on the traces, after the firing of the shot.

The use of records so produced to give information as to the sub-surface structure of the earth is based on the principle that part of the energy of the seismic disturbance caused by the explosion will travel downwardly into the earth and be reflected back to the surface by various more or less well defined strata existing below the surface and that the arrival of reflected energy at the surface will be detectable on the record. By reading the arrival time of such a disturbance on the record, the depth of the reflecting stratum can be computed, using data otherwise obtained on the velocity of the seismic waves in the substrata.

Identification on the record, of reflections, depends on two principles. The first is the direction finding properties of the seismo pick-up arrangement. The identification of a disturbance on the record as a reflection may be made, since a reflection will appear on each of the traces in such a time sequence as to indicate they were coming from some point below, rather than horizontally from the shot-point. The second principle is that a reflection will show some increase in the amplitude of the motion indicated by the trace. These two characteristics of a reflection, that is a particular sequence in the lining up of the disturbances of the traces, and the increase in the general amplitude of the traces, are fundamentally connected in that a reflection to show through the random disturbances must signal the arrival of additional vibrationary energy from the sub-surface.

Actually the detection of reflected waves on the record is very often extremely difficult. This is largely due to the fact that the traces generally show rather continuous random disturbances resulting from energy coming to the geophones directly, or by reflection from the shot, or created by outside disturbances such as moving objects in the vicinity, or the wind. The reception of weak and multiple reflections is a further complication. The interpretation of the record displaying the reflected waves is also more difficult in view of the fact that conventionally, the records of as many as 24 geophones are recorded on a single strip of recording paper, causing some overlapping and confusion of the individual traces. An additional factor complicating the interpretation of the record is the fact that the nature of seismic energy produced by an explosion is more or less determined by the physical characteristics existent at the point of the earth where the charge is fired. Depending upon the hardness, the viscosity, and the density of the earth at the firing point, the seismic disturbance produced will vary considerably in its nature. Consequently, a certain amount of experience and skill is required to accurately determine a reflection as distinguished from random disturbances. Many methods have been proposed for simplifying the identification of the reception of reflected seismic energy on records of this type.

I have now found that this object may be accomplished by producing seismic energy having directional properties. Seismic energy, according to my invention, is produced in a predominantly downward direction causing reflections of higher strength than are conventionally obtained. By this means the ratio of the amplitude of a reflection on the record, to the amplitude of random disturbances is increased, so that the confusion due to these random disturbances in interpreting the record is minimized. A further advantage of my invention relates to the aforementioned fact that a variation in the nature of seismic energy produced results due to the various earth formations in which the seismic energy is created. In accordance with my invention I detonate a vertical train of explosives, extending through sub-strata of varying compositions. The characteristic of the seismic energy thus produced will not vary materially, due to the difference in the composition of one, or more of the sub-strata in which the vertical train of explosives is placed.

The nature of this invention, and the objects and advantages of it, will be more clearly understood from the following detailed description in connection with the accompanying drawings in which;

Fig. 1 is represents diagrammatically the procedure of carrying out my invention using a continuous train of explosives, and in which;

Figure 1:
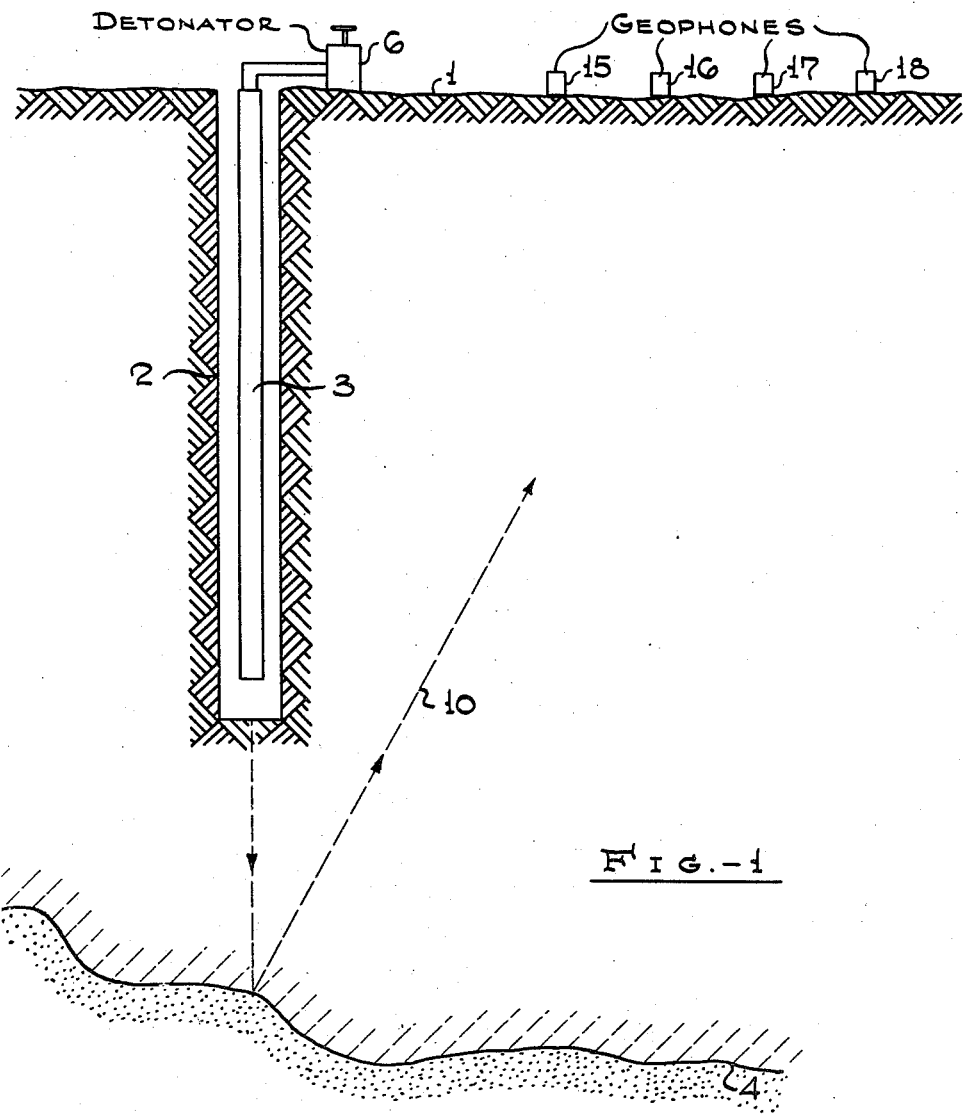

Referring specifically to Fig. 1, 1 represents the surface of the earth in the vicinity of the sub-strata being examined, 2 is a substantially vertical drill hole in which a continuous train of explosives 3 is positioned. The drill hole 2 may be inclined somewhat from the vertical so as to be aligned in the general direction in which it is desired the seismic energy should progress. The continuous length of explosive 3 may be of any suitable length. However, I prefer that at least 75 feet of explosive be employed. The depth of this length of explosive below the surface of the earth is not critical. However, due to the unsatisfactory propagation of seismic energy in the unconsolidated weathered layer of the earth, I prefer that the explosive be positioned below this layer. The nature of explosive 3 is so chosen that the velocity of detonation of the train is substantially that of the seismic energy in the particular locality in which the explosive is positioned. In general the velocity of seismic energy in the earth is at least 5000 feet per second and usually in the range from about 7500 to 8400 ft. per second. Suitable explosives having approximately this velocity of detonation may be chosen, such as dynamite which has a velocity of detonation which may be approximately the velocity desired. On detonation of the explosive 3, at its upper end by the detonator 6, the explosive will be fired along its length in a manner which will cause a substantial building up of the seismic energy produced along the train downwardly into the earth. The effect is to provide a cumulative compounding of the seismic energy in a downward direction. A convenient means of providing a suitable continuous train of explosives is to connect sticks of suitable dynamite by successively screwing adjoining sticks of dynamite into threaded cardboard connectors. The seismic energy produced by the explosion of such a charge will be reflected from substratum 4, along the course 10, and may be received by seismo pick-ups 15, 16, 17, and 18, positioned as desired on the surface of the earth, or in the earth. Any desired number of geophones may be used. Associated with the geophones, not shown in the drawing, are conventional amplifying and recording means. In addition to the reflected energy received by the geophones along the path 10, the geophones will also receive seismic energy travelling directly from explosive 3, or reflected from the surface of the ground, and will also pick up other random disturbances of the type mentioned. Because of the directional properties of the seismic energy produced by the train of explosive 3, it is apparent that this invention increases the ratio of the reflected seismic energy travelling along course 10, to any other seismic energy arriving at the geophones. It will be also noted that due to the progressive detonation employed, the nature of the seismic energy projected from the lower end of the explosive train 3, will be dependent in part on the entire length of sub-strata in which the explosive is positioned. Pecularities, or non-uniformities in particular levels along the train 3, will thus not be determinative of the nature of the seismic energy ordinarily projected on detonation of the train, since the energy produced depends upon the composite properties of the sub-strata along the entire length of explosive. For these reasons therefore, interpretation of a seismic record produced by the method of Fig. 1, is materially simplified.

Figure 2:
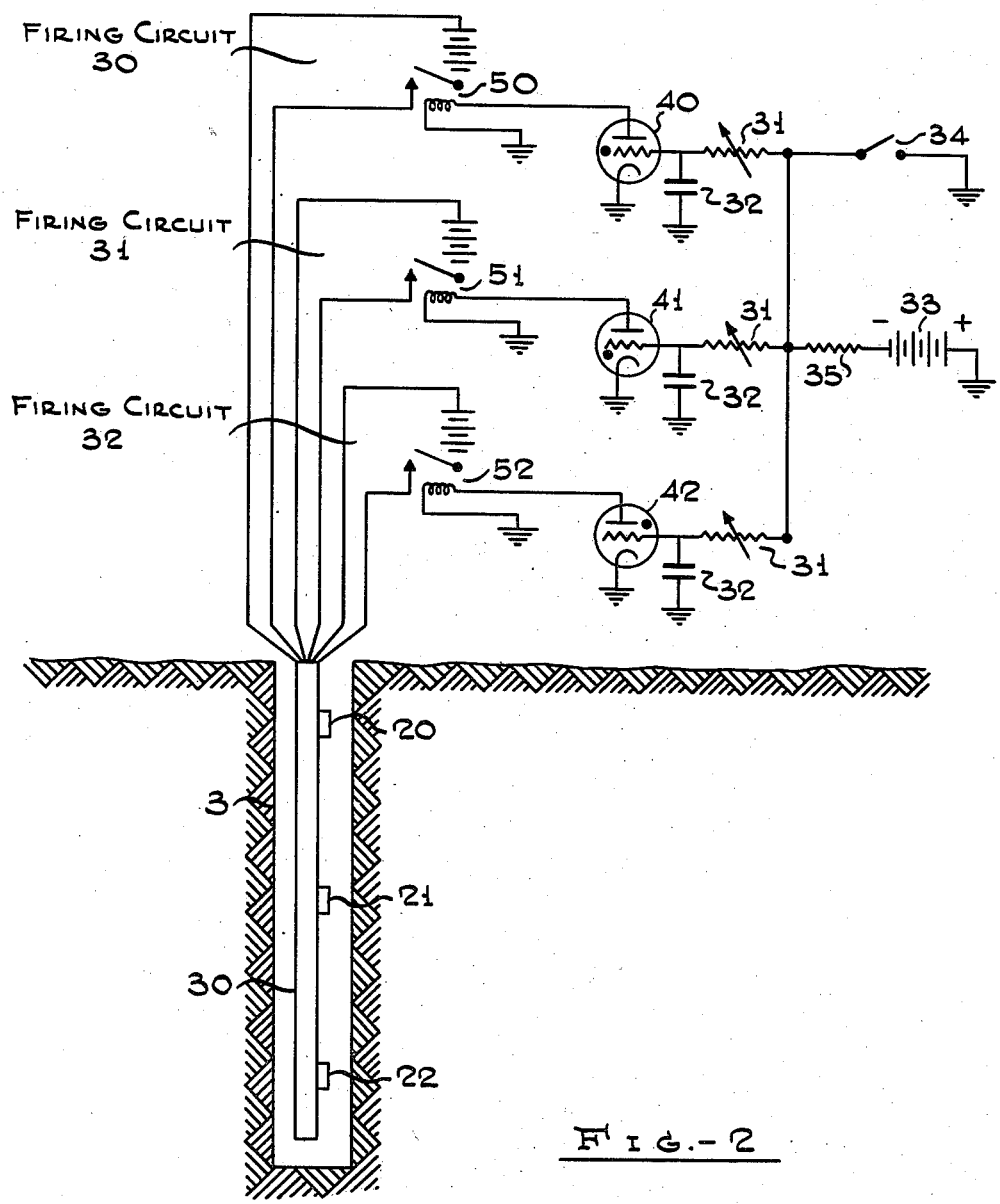
Fig. 2 represents a further embodiment of my invention, employing a plurality of spaced charges.

Referring now to Fig. 2, I employ a number of individual explosive charges 20, 21, and 22, which are positioned in a vertical hole 3. Any desired number of charges may be used. These charges may be attached to the external surface of a pipe 30. Holes are drilled in the walls of the pipe adjacent to each explosive charge, so that suitable electrical conductors for detonating the charges may be carried to the surface of the earth through the pipe 30. The pipe 30 may be constructed of any desired material, such as iron, it only being required that the pipe have sufficient strength to protect the electrical conductors within the pipe so as to prevent breaking of the electrical connection to the lower charges by detonation of the upper charges. In accordance with this embodiment of my invention I determine the velocity of seismic waves along the hole 3, by first positioning geophones in the hole, having positions corresponding to those chosen for placement of the individual charges. By detonating a trial charge adjacent to the top of the hole 3, and individually recording the outputs of each of the geophones, the velocity of seismic waves along the hole 3 may be precisely determined. Having determined this velocity, and knowing the spacing of the explosive charges, the desired sequence of firing of the charges may be determined. This sequence is such that each of the charges will explode at the instant seismic waves will have progressed to the charge from the explosion of charges above. In a manner similar to that described in connection with Fig. 1, seismic energy will become compounded having a cumulative downward direction.

Any suitable means for firing the charges 20, 21, and 22 in the desired sequence may be used. However, I prefer to use the electronic apparatus illustrated in Fig. 2. A number of thyratrons, 40, 41 and 42, corresponding to the number of individual charges, are connected to fast acting relays 50, 51, and 52 controlling the firing circuits of the individual charges. In the grid circuit of each thyratron is a variable R. C. network comprising resistors 31, and condensers 32, on which is impressed a suitable voltage to bias the thyratrons beyond cutoff. The source of the bias voltage is battery 33, connected as shown through a resistance 35. A switch 34 is connected to the R. C. network of the grids, which when closed grounds the grid circuits. Each of the R. C. constants in the grid circuits of the thyratrons is adjusted to delay the leakage of the grid bias from the thyratrons, to provide the desired sequence of the firing of the explosive charges 20—22. The firing of the charges is accomplished by closing the switch 34, which permits the cutoff bias to leak off the grids of the thyratrons through the properly adjusted R. C. networks, so that each of the fast acting relays will close the firing circuits of the explosive charges in the desired sequence. A particular advantage of the embodiment of the invention illustrated in Fig. 2, is that the firing sequence may be determined with sufficient precision to detonate the individual charges at a rate equal to that of the propagation of seismic energy along the hole 3, irrespective of any velocity gradient along the hole. It is apparent, in the embodiment shown in Fig. 2, that the size of the charges will be limited by the strength of the pipe 30 protecting the conductors leading to the charges. A preferred embodiment of my invention, therefore, is to associate each of the charges with a delayed action detonator. Such detonators are of conventional design, and are so constructed that a finite time interval will pass between application on the electrical firing impulse, and the actual detonation. Commonly such a delay is obtained by means of a powder train contained within the detonator. In this adaptation of my invention, the electrical impulses to each of the firing circuits is applied at the same instant. The time delay of the individual detonators will have been selected so that the desired firing sequence of the charges will be obtained. It is apparent that in this embodiment the strength of the pipe 30 is not critical, and if desired pipe 30 may be dispensed with, the charges simply being suspended in the hole 3. As stated, the number of spaced charges used is not critical, nor is the length over which they extend. However, as in Fig. 1, I prefer that the total length should be not less than 75 feet, and I also prefer that at least six individual charges be used.

By means of the embodiments described, I produce a seismic wave having directional properties and directed substantially downward. For this purpose I employ a vertical train of explosives having a velocity of detonation along that train, substantially equal to the velocity of seismic waves. It is apparent that many modifications of this idea may be made. For example, the nature, position, arrangement and firing of the train of explosives may be greatly varied. It is, therefore, to be understood that the appended claims are to be interpreted broadly commensurate with my contributions to the prior art.

Having now described my invention, I claim:

1. In seismic prospecting, a method of generating directional seismic energy in a shot hole which comprises arranging a plurality of vertically spaced seismic detectors in said shot hole, detonating a trial charge adjacent the top of said shot hole, recording impulses received by each of said detectors whereby the velocity of travel of seismic waves downwardly along said hole may be determined, replacing said seismic detectors by a substantially vertical train of explosives and detonating said train at a velocity substantially equal to the velocity of seismic waves traveling through the earth as determined by the detonation of said trial charge.

2. Method according to claim 1 wherein the train of explosives employed comprises a continuous length of explosives having a velocity of detonation approximately that of the seismic wave velocity as determined by detonation of said trial charge.

3. Method according to claim 1 wherein said vertical train of explosives comprises an array of at least six vertically spaced explosive charges and wherein said charges are detonated in a time sequence from the top to the bottom of said array in such a manner that each successive charge is detonated at substantially the instant seismic energy produced by the uppermost charge has proceeded through the earth to the depth of the particular charge fired, as determined from the detonation of the trial charge.

CLARENCE B. SCOTT.

REFERENCES CITED

The following references are of record in the file of this patent:

UNITED STATES PATENTS

| Number | Name | Date |
| --- | --- | --- |
| 1,899,970 | McCollum | Mar. 7, 1933 |
| 1,998,412 | Prescott | Apr. 16, 1935 |
| 2,064,451 | Voorhees | Dec. 15, 1936 |
| 2,133,484 | Sherar | Oct. 18, 1938 |
| 2,151,878 | Weatherby | Mar. 28, 1939 |
| 2,156,198 | Scherbatskoy | Apr. 25, 1939 |
| 2,340,314 | Farnham | Feb. 1, 1944 |

OTHER REFERENCES

Olson: "Elements of Acoustical Engineering," D. Van Nostrand Co. Inc., New York, New York. Second edition, first published April 1940, page 9.